UNITED STATES PATENT OFFICE.

AUGUST F. BLOUIN, OF SPRINGFIELD TOWNSHIP, DELAWARE COUNTY, PENNSYLVANIA, ASSIGNOR TO ABRASIVE MATERIAL COMPANY, OF PHILADELPHIA, PENNSYLVANIA.

COMPOSITION OF ABRASIVE MATTER.

1,042,878. Specification of Letters Patent. Patented Oct. 29, 1912.

No Drawing. Application filed July 20, 1912. Serial No. 710,733.

*To all whom it may concern:*

Be it known that I, AUGUST F. BLOUIN, a citizen of the United States, residing in Springfield township, Delaware county, in the State of Pennsylvania, have invented certain new and useful Improvements in Composition of Abrasive Material, of which the following is a specification.

It is well known that the composition of abrasive matter will regulate its degree of hardness and that the form of crystallization will regulate its usefulness as an abrasive. Most aluminous abrasive matters which show a high degree of hardness have such a crystallization of their composition that they do not break away easily enough in the process of grinding and can, therefore, be successfully used for a few definite purposes only. This defect is overcome by my new improvemenet in composition of abrasive material, which consists of aluminum oxid in combination with silicon, boron, chromium and carbon.

In preparing my product I select any natural ore rich in aluminum oxid or I may use chemically prepared alumina. With this, depending on its analysis, I combine suitable quantities of materials containing the elements silicon, boron, chromium and carbon, using for same any natural minerals or manufactured chemicals containing these elements, which in part act as media for the removal of objectionable impurities, when present, and in part as media for the formation of my new composition of abrasive matter. In my product I obtain a material containing 90% to 99% of $Al_2O_3$, with the other elements varying with this percentage, none, however, exceeding 3%. This composition, when made properly, yields a well crystallized material, each particle presenting an agglomeration of interlaced crystals, which are extremely hard, but possess just enough toughness to allow parts of each grain to break away, whenever grinding or abrading conditions require it, this quality making it useful for grinding purposes of all possible descriptions.

For the purpose of manufacturing my improved product, I prefer to melt the selected alumina-ore, or chemical preparation of the same, mixed with the proper amounts of ores or chemical preparations containing silicon, boron, chromium and carbon in an electric furnace with adjustable horizontal or vertical graphite electrodes, such as shown, for instance, in U. S. Letters Patent #929,517, granted to Frank J. Tone on July 27, 1909.

As an example of the proportions in which the ingredients forming my new composition of material may be employed, I may use a mixture consisting of 100 pounds of an aluminum ore containing approximately 78% of aluminum oxid, 12 pounds of anhydrous borax, .3 of a pound of chromite, and 4.75 pounds of carbon. In the furnace the mixture is fed between the arc, which is regulated as to power according to the requirements of the composition of the mixture itself. The resulting fused mass, when cool, is crushed and cleaned for abrasive purposes.

With a mixture having the ingredients in the proportions noted above, the abrasive material formed has the following composition: viz., aluminum oxid, 92.35%; silicon, 2.93%; boron, 2.45%; chromium, .12%, and carbon, 1.39%.

I claim:—

1. As a new composition of abrasive material, a crystalline product containing essentially aluminum oxid, silicon, boron, chromium, and carbon.

2. As a new composition of abrasive material, a crystalline product containing approximately 92.35% of aluminum oxid, 2.93% of silicon, 2.45% of boron, .12% of chromium, and 1.39% of carbon.

In testimony whereof, I have hereunto set my hand in presence of two witnesses.

AUGUST F. BLOUIN.

Witnesses:
J. H. BYERS,
THEO. C. KNIGHT.